Patented Nov. 4, 1941

2,261,672

UNITED STATES PATENT OFFICE 2,261,672

PREPARATION OF FERRICYANIDE FREE FROM COLOR BODIES

Robert B. Barnes, Stamford, and Garnet P. Ham, Old Greenwich, Conn., assignors to American Cyanamid Company, New York, N. Y., a corporation of Maine No Drawing. Application October 12, 1939, Serial No. 299,144

11 Claims. (Cl. 23—77)

This invention relates to methods of producing sodium ferricyanide and to concentrated solutions thereof, free from normally occurring impurities.

The production of ferricyanides generally by oxidation of ferrocyanide solutions and by means of chlorine is a well established industry. This involves the simple procedure of bubbling chlorine gas through a solution of the ferrocyanide without particular attention being paid to the conditions attending oxidation. In view of the fact that such oxidation gives rise to hydrochloric acid as a by-product, regardless of the initial pH of the solution, the solution gradually becomes more and more acidic.

The presence of considerable quantities of hydrochloric acid favors undesirable side reactions, the more serious of which is the production of iron cyanogen complexes of indeterminate composition, hereinafter referred to as color bodies. These are characterized by a relatively broad absorption band with a maximum at approximately 5600A° (Ångstrom).

Ferricyanides containing these complexes as an impurity have limited application in the arts. That is, wherever such ferricyanides are used as a dye component, it is believed the complexes add an off-color pigment to the product. For instance in blue print coatings, these undesirable complexes may dye the paper so that one obtains a colored background rather than the desired white. Moreover, auto-reduction or other detrimental decomposition of ferricyanides in coatings used in light-sensitive work is well known and it is entirely possible that the presence of these color bodies may be responsible in a large measure for such undesirable degradation.

Such excess acidity also has a tendency to generate some hydrocyanic acid in the reacting magma with consequent loss of cyanogen and general inefficiency in the process.

The above difficulties are particularly troublesome in the event that high concentrations of ferricyanides are attempted by prolonged oxidation.

It is the principal object of the present invention, therefore, to produce by oxidation methods concentrated aqueous solutions of sodium ferricyanide containing 30% or more of the salt, such solutions being free or substantially free from these undesirable complexes.

While it has been determined that a pH below 7 favors the formation of color bodies, yet when attempts are made to neutralize this excess acidity to raise the pH above 7, difficulties are encountered. Generally speaking, however, this mounting acidity and lowering pH may be counteracted by judicious use of alkali. Care must be exercised, however, in not only the choice but the use of alkali. Any alkali effective for controlling the pH between the desired limits is satisfactory. Those of a soluble nature are preferred. Those of limited solubility are open to the objection that a considerable quantity thereof must be introduced before the desired effect is obtainable. Calcium carbonate for instance is generally unacceptable due to its extreme insolubility and low alkalinity, while on the other hand, such alkalis as sodium hydroxide, while usable, are not preferred by reason of the fact that it is a very strong alkali and, therefore, in the local areas where it is added to the reaction mixture, it tends to cause reversion of the ferricyanide to the ferro form, (due to its high alkalinity), ferric hydroxide, ammonia and other undesirable side reactions. While these side reactions may be minimized by using caustic as very dilute solutions, yet this added water is undesirable from the standpoint of producing concentrated liquors.

Commercial soda ash, another readily available alkali, sometimes contains bicarbonate. This latter substance is an undesirable component of the reaction mixture, in that its curve of alkalinity when plotted against concentration shows a plateau. At this portion of the curve, therefore, considerable quantities of bicarbonate must be added in order to neutralize corresponding amounts of acidity. As a consequence, the final product may contain a large amount of bicarbonate in solution so that when such a product is put to an industrial use, involving contact with an acid or acidic material, foaming may result as a consequence of the generation of carbon dioxide.

Perhaps the most satisfactory neutralizing agent is the monohydrated sodium carbonate. This may be used either as a solid or as a solution, although the latter is preferred, in view of the fact that in this form its neutralizing effect is instantly available and it may be completely disseminated throughout the reaction mixture.

From the above, it will be noted that it is important that in no event should the pH of the reaction mixture exceed a point where reversion to ferro will take place or ferric hydroxide, or ammonia produced. Generally speaking, this point is at 9.5.

The hydrogen ion concentration factor of the reaction, therefore, should be kept in all events between 7.0 and 9.5, although a pH of 8.3 to 8.6 is preferred, as between these limits optimum conditions obtain.

Among the other desirable contributing factors looking toward the production of highly concentrated solutions of sodium ferricyanide is the maintenance of solid phase ferro in the solution undergoing oxidation. Normally speaking, when starting with a saturated solution of sodium ferrocyanide, one may obtain on completing oxidation, a final solution containing only that much sodium ferricyanide. In order, therefore, to increase the concentration of ferricyanide in the final product, it is desirable to maintain solid phase ferrocyanide in the mixture undergoing oxidation during the entire period. This solid phase ferro should preferably be of fine particle size in order to increase the interfacial area between the particles and the liquid, to facilitate replenishing the solution with ferro as it becomes exhausted through oxidation to ferri. Inasmuch as the solubility of sodium ferrocyanide in a solution of ferricyanide decreases with increasing concentration of the latter, this fact among others establishes the upper limit to which one may go in obtaining concentrated ferricyanide solutions. Actually, concentrations in excess of 50% have been obtained, although 36 gs. of sodium ferricyanide per 100 cc. of solution is readily obtainable as a practicable matter without difficulty.

Another contributing factor which should not be disregarded is the temperature at which the reaction is carried out. Where chlorine is used as the oxidation agent, the temperature should be maintained between 20 and 40° C., although preferably as near to 25° as possible. Above 40° C., the formation of color bodies is favored, while at temperatures lower than 20° C., the solubility of ferro descreases undesirably.

It is also important to maintain efficient contact with chlorine avoiding both a deficiency and a wasteful excess of the gas and this may be obtained by passing the chlorine through diffusers, immersed in the oxidation tank, together with the use of efficient agitation, the gas feed being such that only sufficient gas escapes to indicate no deficiency.

Following the above procedure, solutions of sodium ferricyanide may be obtained, having concentrations as high as 50%, without resort to water removal or other concentrating steps while at the same time such product is free or substantially free from the undesirable color bodies.

By rapidly filtering the reacting mixture when the desired concentration has been reached solid phase ferro and other solids are removed, the excess chlorine in the liquid oxidizing the small amount of residual ferro dissolved therein, to such an extent that concentrated ferri solutions containing as low as .004% have been obtained in a solution containing 36 gs. of sodium ferricyanide per 100 cc. of solution.

Example I

A slurry was made up of 8000 cc. of water and 5856 grams of micropulverized pure crystalline sodium ferrocyanide of the best technical grade, containing 10 molecules of water of crystallization. The slurry was agitated and kept substantially at a temperature of 25° C. until as much ferrocyanide has been dissolved as could be taken up by the water at that temperature. At this time, unconverted solid phase sodium ferrocyanide existed in the tank. Agitation was provided so as to keep the solid phase ferrocyanide in suspension.

Chlorine was passed into this slurry through a diffuser located centrally and at the bottom of the tank. The pH at the start was 9.68. Three minutes after the chlorination had started, the pH had dropped to 8.5. At this point, solid monohydrated sodium carbonate was slowly added while continuing the chlorination. The pH of the solution was read continuously by means of a Beckman pH meter provided with one calomel and one glass electrode. The addition of the neutralization agent continued as necessary, at no time permitting the pH to drop below 8.5. At the end of 110 minutes, chlorination was stopped, the slurry permitted to settle and then filtered. A determination of the liquor showed the presence of 35 grams of sodium ferricyanide in each 100 cc. of liquor, whereas the unconverted ferrocyanide was .4 grams per 100 cc.

Transmission tests on a General Electric Recording Spectrophotometer showed substantially no absorption at 5600 Ångstrom units, indicating therefore a substantial absence of color bodies.

Example II

A slurry was made of 330 grams of micropulverized pure sodium ferrocyanide containing 10 molecules of water of crystallization in 1200 cc. of water. This mixture was heated to 60° C. to insure saturation with sodium ferrocyanide. The slurry was then cooled before chlorination to 25° C.

The pH of the starting solution was 9.8. Chlorination was carried out as in Example I with suitable additions of solid monohydrated sodium carbonate so as to maintain the pH of the solution no lower than 7.4. At the end of 82 minutes, the temperature of the slurry had risen to 40° C.

At this point, it was noted that there was very little solid phase ferro remaining in solution. The solution was then permitted to settle and filtered. An analysis showed 26.6 grams of sodium ferricyanide per 100 cc. of solution with .02 unconverted ferro per 100 cc. This indicated clearly that an insufficient quantity of sodium ferrocyanide had been used inasmuch as no substantial quantities of solid phase remained at the end of 82 minutes and that in a few more minutes, the solution would have been completely barren of ferro. A transmission test on the spectrophotometer showed the presence of some color bodies, due undoubtedly to the fact that the temperature was permitted to rise to 40° C.

Example III

Starting with 1500 cc. of liquor from Example II, there was added 600 grams of micropulverized pure sodium ferrocyanide thereto. At the start of chlorination, the pH was 8.0. Chlorination was continued as indicated above with good stirring and addition of monohydrated sodium carbonate so as to prevent the pH from dropping below 7.05. At no time did the temperature exceed 30° C. At the end of one hour and forty-five minutes, the pH was 7.5 and an analysis of the filtered liquor showed 37.5 grams of sodium ferricyanide per 100 cc. of liquor while the sodium ferrocyanide content was .2 grams per 100 cc. The product showed the presence of no more color bodies than did that of Example II. Side reactions to an additional extent had therefore been prevented.

Example IV

A slurry of micropulverized pure sodium ferrocyanide was made in water with agitation until a saturated solution containing solid phase ferro was obtained. The temperature was maintained at approximately 25° C. and chlorinated as in the above examples. The pH, at the start, was approximately 9.5 and from time to time monohydrated sodium carbonate was added so as to keep the pH definitely on the alkaline side. Additional quantities of micropulverized pure sodium ferrocyanide were also added from time to time so as to maintain a slurry heavy with solid phase ferro. The chlorination continued for approximately 5 hours at the end of which time, the liquid was permitted to settle and filtered. The filtrate showed the presence of 50.1 grams of sodium ferricyanide per 100 cc. of solution, while the unconverted sodium ferrocyanide was .3%. The product was free from undesirable color bodies.

Example V 1100 grams of micropulverized pure sodium ferrocyanide containing 10 molecules of water of crystallization were slurried with 1500 cc. of water until the water was saturated with the salt at a temperature of 25° C. and some solid phase remained. The pH at the start was 9.3. The chlorination was conducted as in the above examples. As the chlorination proceeded, the pH dropped and an effort was made to keep the solution on the alkaline side by periodic additions of solid calcium hydroxide. It was not as easy to maintain a uniform pH using this alkali as was experienced, for instance, with the monohydrated sodium carbonate in the above examples as considerable fluctuation took place, the pH frequently dropping below 7. This fluctuation was undoubtedly due to the fact that the alkali was added in solid form and being difficultly soluble, there was evidently considerable lag between the time of addition and the solution of that quantity to effectively change the pH.

After 145 minutes, the chlorine was discontinued and the batch filtered to remove unconverted solid ferrocyanide and a calcium-containing sludge. An analysis of the filtered liquor showed 36.8 grams of sodium ferricyanide per 100 cc. of solution with unconverted ferro of .004. A considerable quantity of color bodies had been formed due undoubtedly to the lack of accurate control in the alkali additions inasmuch as the pH frequently dropped below 7.

The above shows the effect of permitting the pH to drop below 7. It also shows the desirability of using an alkali which may have effective amounts thereof made instantly available in the solution. Consequently, an alkali readily soluble is extremely desirable and, as a matter of fact, to secure a nicety of control, the alkali should be added in solution form.

Example VI

Much the same effect was secured by adding commercial lump soda ash as the neutralizing agent. Due to the fact that the rate of solubility of soda ash in the solution was under the circumstances less than the rate of formation of acidic materials in the chlorinating batch and that the soda ash contained bicarbonate, the pH occasionally dropped to the acid side. As a matter of fact, at the end of the chlorination period, while theoretically ample alkali in the solid form had been added to take care of any acid formed, the batch was still acid and there remained solid alkali in the bottom of the treatment kettle. This emphasizes the importance of using a readily soluble alkali of which effective amounts are made instantly available in the solution for neutralization purposes provided, of course, a final ferri liquor is desired, substantially free from color bodies. In situations where such color bodies do not interfere with the use of such liquors, this is not so important.

Example VII 5856 grams of micropulverized pure sodium ferrocyanide with 10 molecules of water of crystallization were slurried with 8000 cc. of water until a saturated solution containing solid phase ferro was obtained. Chlorination was then begun, the pH standing at 9.5. When enough chlorine had been added to lower the pH to approximately 8.5, a 60% solution of sodium hydroxide was dribbled in. It was found that the alkali had to be added continuously in order to hold a fairly constant pH value. During the chlorination, the pH varied from 8.1 to 9.9. At the end of 145 minutes, the pH was 8.3. The batch was allowed to settle and filtered and a test on the filtrate showed 32.2 grams of sodium ferricyanide per 100 cc., while the unconverted ferro was .06. Some ferric hydroxide was noted on the filter.

We claim:

1. A method of producing a solution of sodium ferricyanide, characterized by its substantial freedom from color bodies, showing an absorption band at 5600A° which comprises chlorinating a solution of sodium ferrocyanide while maintaining the pH between 7 and 9.5 throughout the chlorination.

2. A method of producing a solution of sodium ferricyanide, characterized by its substantial freedom from color-bodies, showing an absorption band at 5600A° which comprises chlorinating a solution of sodium ferrocyanide while maintaining the pH between 8.3 and 8.6 throughout the chlorination.

3. The method of claim 1 in which the pH control is obtained by neutralizing developed acidity with sodium carbonate.

4. The method of claim 1 in which the pH control is obtained by neutralizing developed acidity with monohydrated sodium carbonate.

5. The method of claim 1 in which the pH control is obtained by neutralizing developed acidity with monohydrated sodium carbonate in solution.

6. A method of producing a solution of ferricyanide, characterized by its substantial freedom from color-bodies, showing an absorption band at 5600A° which comprises chlorinating a solution of sodium ferrocyanide while maintaining the pH between 7 and 9.5 throughout the chlorination, the chlorination taking place in the presence of solid phase sodium ferrocyanide.

7. A method of producing a solution of sodium ferricyanide, characterized by its substantial freedom from color bodies, showing an absorption band at 5600A° which comprises chlorinating a solution of sodium ferrocyanide while maintaining the pH between 7 and 9.5 throughout the chlorination, the temperature being maintained between 20 and 40° C.

8. A method of producing a solution of sodium ferricyanide, characterized by its substantial freedom from color bodies, showing an absorption band at 5600A° which comprises chlorinating a solution of sodium ferrocyanide while maintaining the pH between 7 and 9.5 throughout the chlorination, the temperature being maintained at substantially 25° C.

9. A method of producing a solution of sodium ferricyanide, characterized by its substantial freedom from color bodies, showing an absorption band at 5600A° which comprises chlorinating a solution of sodium ferrocyanide while maintaining the pH between 8.3 and 8.6 throughout the chlorination, the reaction being carried out at substantially 25° C. and in the presence of solid phase sodium ferrocyanide.

10. A method of producing a solution of sodium ferricyanide, characterized by its substantial freedom from color bodies, showing an absorption band at 5600A° which comprises chlorinating a solution of sodium ferrocyanide, and continuing the chlorination until the sodium ferricyanide content is at least 30 g. per 100 cc. of solution while maintaining the pH between 7 and 9.5 throughout the chlorination.

11. A method of producing a solution of sodium ferricyanide, characterized by its substantial freedom from color bodies, showing an absorption band at 5600A° which comprises chlorinating a solution of sodium ferrocyanide, and continuing the chlorination until the sodium ferricyanide content is from 40 to 50 g. per 100 cc. of solution while maintaining the pH between 7 and 9.5 throughout the chlorination.

ROBERT B. BARNES.
GARNET P. HAM.